United States Patent
Sone et al.

(10) Patent No.: US 8,965,202 B2
(45) Date of Patent: Feb. 24, 2015

(54) OPTICAL POWER MONITOR, OPTICAL POWER CONTROL SYSTEM AND OPTICAL POWER MONITOR METHOD

(71) Applicant: Fujitsu Limited, Kawasaki (JP)

(72) Inventors: Kyosuke Sone, Kawasaki (JP); Yasuhiko Aoki, Yokohama (JP); Takahito Tanimura, Berlin (DE); Toshiki Tanaka, Setagaya (JP); Shoichiro Oda, Fuchu (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 13/693,237

(22) Filed: Dec. 4, 2012

(65) Prior Publication Data

US 2013/0251365 A1    Sep. 26, 2013

(30) Foreign Application Priority Data

Mar. 23, 2012 (JP) ................................. 2012-067215

(51) Int. Cl.
*H04B 10/08* (2006.01)
*H04B 17/00* (2006.01)

(52) U.S. Cl.
CPC .................................. *H04B 17/00* (2013.01)
USPC .................................. 398/38; 398/25; 398/26

(58) Field of Classification Search
CPC ............................. H04B 17/00; H04B 17/003
USPC ............................................. 398/38, 25, 26
See application file for complete search history.

(56) References Cited

U.S. PATENT DOCUMENTS

| | | | | |
|---|---|---|---|---|
| 5,243,983 | A * | 9/1993 | Tarr et al. | 600/318 |
| 5,500,756 | A * | 3/1996 | Tsushima et al. | 398/181 |
| 5,907,420 | A * | 5/1999 | Chraplyvy et al. | 398/180 |
| 6,078,414 | A * | 6/2000 | Iwano | 398/182 |
| 6,597,822 | B1 * | 7/2003 | Moslehi et al. | 385/13 |
| 6,711,183 | B1 * | 3/2004 | Mizuuchi et al. | 372/22 |
| 6,728,491 | B1 * | 4/2004 | Ooi et al. | 398/147 |
| 6,795,607 | B1 * | 9/2004 | Archambault et al. | 385/24 |
| 6,864,986 | B2 * | 3/2005 | Nyman et al. | 356/484 |
| 6,977,731 | B1 * | 12/2005 | Lee et al. | 356/519 |
| 7,917,033 | B2 * | 3/2011 | Sakata et al. | 398/79 |
| 8,891,972 | B2 * | 11/2014 | Honda | 398/147 |
| 2001/0043772 | A1 * | 11/2001 | Sorin | 385/28 |

(Continued)

FOREIGN PATENT DOCUMENTS

JP    2011-82749    4/2011

OTHER PUBLICATIONS

British Search Report mailed Mar. 5, 2013 for corresponding British Application No. GB1221817.8.

*Primary Examiner* — Ken Vanderpuye
*Assistant Examiner* — Abbas H Alagheband
(74) *Attorney, Agent, or Firm* — Staas & Halsey LLP

(57) ABSTRACT

An optical power monitor that detects optical power of respective wavelengths of a signal light in a wavelength multiplexing system, includes: a light emitter configured to superimpose a frequency modulation component on a signal light; a wavelength tunable filter configured to sweep a pass band of the signal light across a wavelength band for a signal light; and a detector configured to detect intensity changes in optical power passing through the wavelength tunable filter with a frequency modulation of the optical power, and to detect an optical power measurement value at a middle point of two points of the intensity changes of the optical power as the optical power of a wavelength to be measured.

12 Claims, 13 Drawing Sheets

(56) References Cited

U.S. PATENT DOCUMENTS

| | | | |
|---|---|---|---|
| 2002/0063935 A1* | 5/2002 | Price et al. | 359/180 |
| 2002/0126352 A1* | 9/2002 | Shake et al. | 359/124 |
| 2002/0130256 A1* | 9/2002 | Macki et al. | 250/227.21 |
| 2002/0176457 A1* | 11/2002 | DeCusatis et al. | 372/26 |
| 2002/0196444 A1* | 12/2002 | Nymen et al. | 356/460 |
| 2003/0231889 A1* | 12/2003 | Brown et al. | 398/186 |
| 2004/0052444 A1* | 3/2004 | Moslehi et al. | 385/13 |
| 2004/0104352 A1* | 6/2004 | Opsal et al. | 250/372 |
| 2004/0146306 A1* | 7/2004 | Muzicant et al. | 398/177 |
| 2004/0208428 A1* | 10/2004 | Kikuchi et al. | 385/24 |
| 2008/0025727 A1* | 1/2008 | Sakata et al. | 398/79 |
| 2010/0150550 A1* | 6/2010 | Hashimoto | 398/34 |
| 2011/0081146 A1 | 4/2011 | Nakajima et al. | |

* cited by examiner

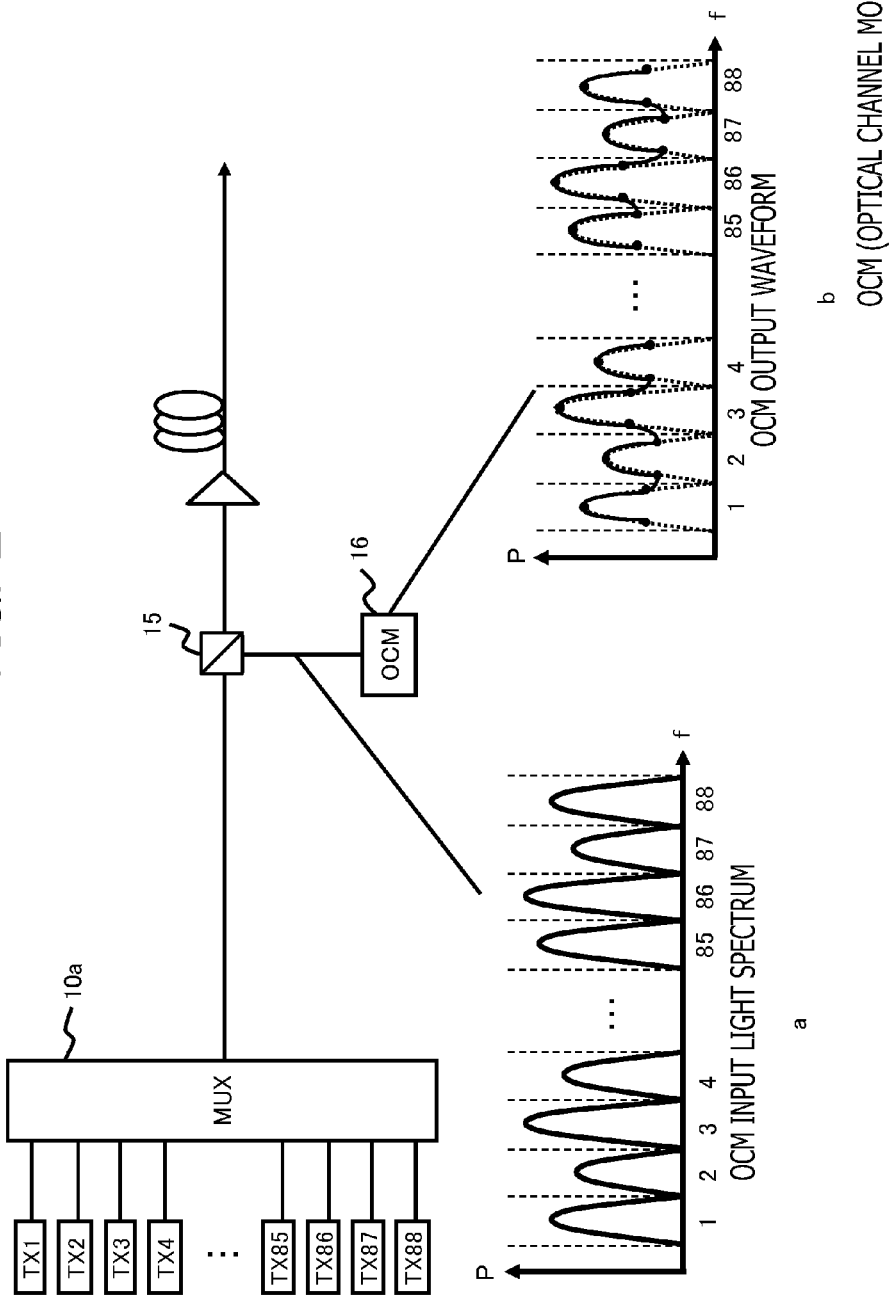

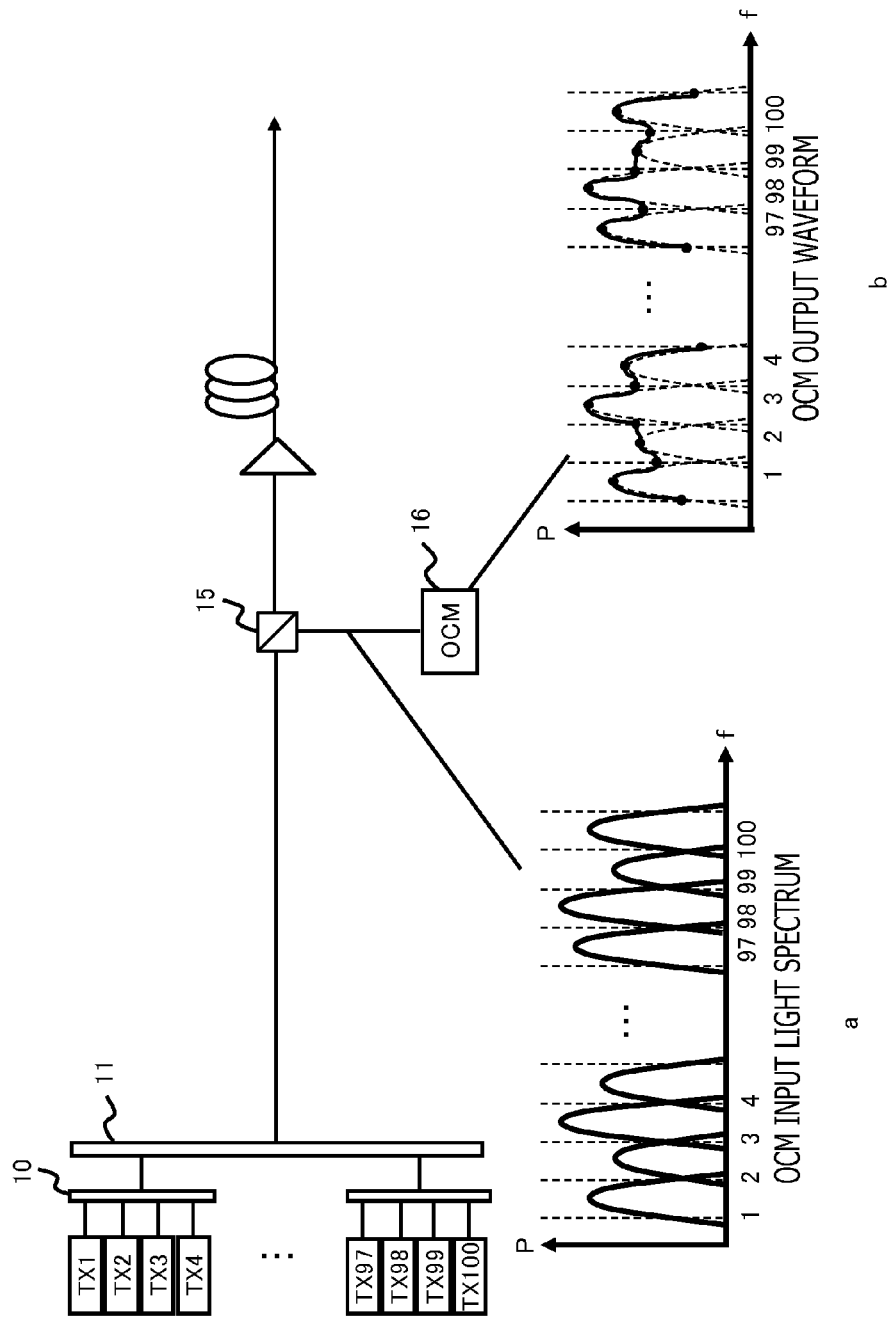

OPTICAL POWER MONITOR, OPTICAL POWER CONTROL SYSTEM AND OPTICAL POWER MONITOR METHOD

CROSS-REFERENCE TO RELATED APPLICATION(S)

This application is based upon and claims the benefit of priority of the prior Japanese Patent Application No. 2012-67215, filed on Mar. 23, 2012, the entire contents of which are incorporated herein by reference.

FIELD

The embodiments discussed herein are related to an optical power monitor.

BACKGROUND

Technologies for improving the efficiency of frequency utilization include an Orthogonal Frequency Division Multiplexing (OFDM) technology, a Wavelength Division Multiplexing (Nyquist-WDM) technology, etc. In the OFDM technology and the Nyquist-WDM technology, wavelengths are multiplexed with a narrower wavelength interval for transmission. In a system that is known as a Superchannel, a plurality of sub-channel signals are multiplexed by using the OFDM technology or the Nyquist-WDM technology and are regarded as a single signal in a transmission system of 100 Gbps or higher. In the Superchannel, when the sub-channel signals are multiplexed in light domain, differences in power level are induced among the sub-channel signals within the Superchannel due to variation in loss or the like in an optical filter or an optical coupler of a multiplexer portion. Differences in optical power level among the sub-channel signals within the Superchannel are induced due to wavelength dependency of an optical amplifier in a transmission path, filtering in Add/Drop of a neighboring channel or the like.

A related technology is disclosed in Japanese Laid-open Patent Publication No. 2011-082749.

SUMMARY

According to one aspect of the embodiments, an optical power monitor that detects optical power of respective wavelengths of a signal light in a wavelength multiplexing system, includes: a light emitter configured to superimpose a frequency modulation component on a signal light; a wavelength tunable filter configured to sweep a pass band of the signal light across a wavelength band for a signal light; and a detector configured to detect intensity changes in optical power passing through the wavelength tunable filter with a frequency modulation of the optical power, and to detect an optical power measurement value at a middle point of two points of the intensity changes of the optical power as the optical power of a wavelength to be measured.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an exemplary channel monitor;

FIG. 3 illustrates an exemplary channel monitor;

DESCRIPTION OF EMBODIMENTS

Figure 1:
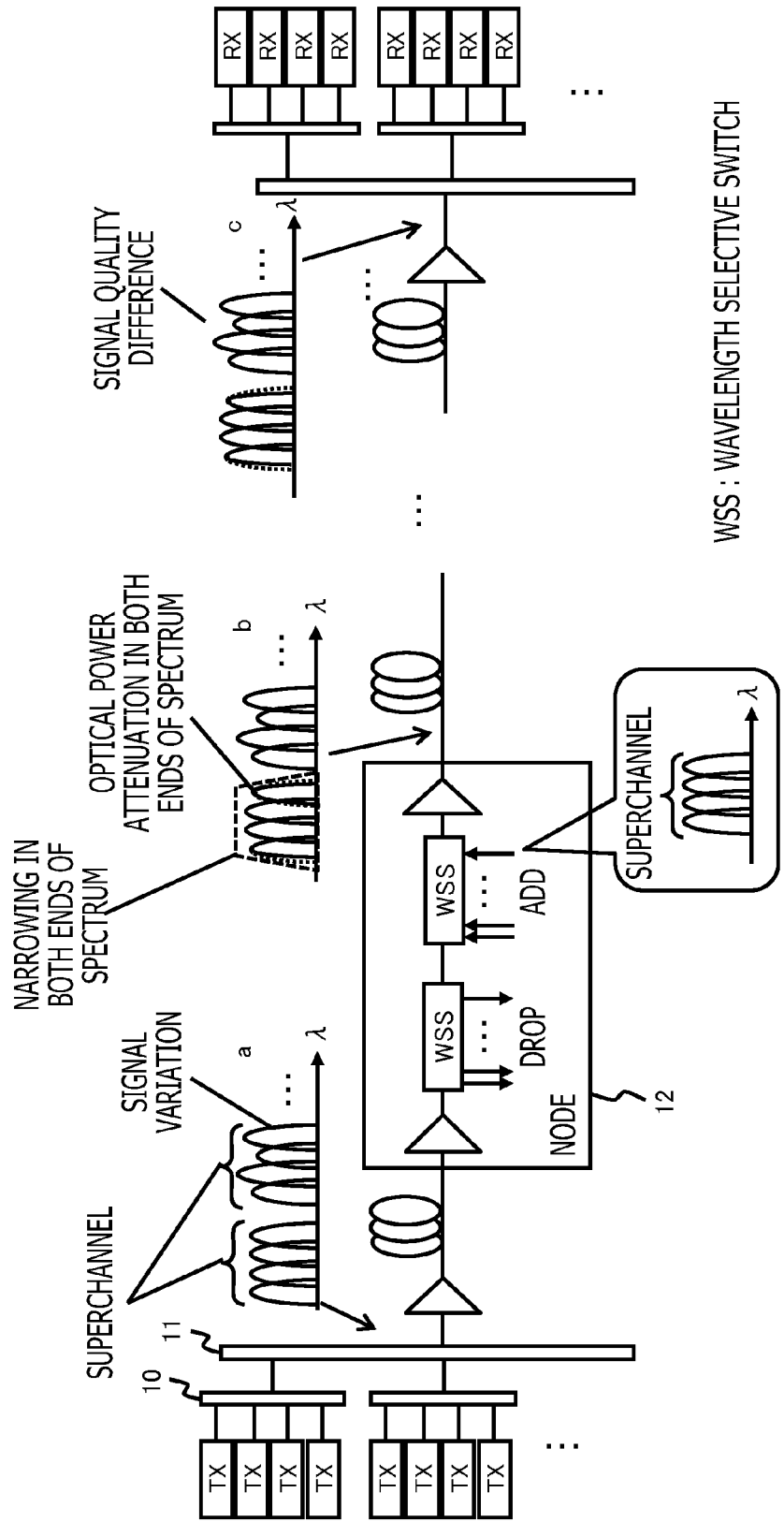
FIG. 1 illustrates an exemplary power variation among sub-channel signals.

FIG. 1 illustrates an exemplary power variation among sub-channel signals. In FIG. 1, the power variation among the sub-channel signals of a Superchannel system is illustrated. Light signals are emitted from transmitters TX of the respective wavelengths, and the light signals of the respective wavelengths are multiplexed by wavelength multiplexers 10 and 11. In a case where an emission power level of each transmitter TX is not appropriately adjusted, variation in signal power may occur within a Superchannel included in one signal, as illustrated in a spectrum "a". The power variation may occur based on the variation in loss or the like in the wavelength multiplexer portions 10 and 11.

In an add-drop node 12 arranged in a transmission path, signals are, for example, added by the unit of Superchannel. However, the optical power in both ends of a Superchannel may be attenuated based on filter characteristics of a wavelength selective switch (WSS) as illustrated in a spectrum "b".

As illustrated in a spectrum "c", since optical power in a light signal spectrum at a receiver side is different within Super channel, signal quality differences may occur e, thereby causing deterioration in reception quality.

Thus, the optical power levels of the respective sub-channel signals are monitored. However, the wavelength interval among the sub-channel signals within a Superchannel is narrower than a WDM frequency signal interval (wavelength interval), for example, 50 GHz. Thus, monitoring accurately with a simple structure may be difficult.

FIG. 2 illustrates an exemplary channel monitor. The channel monitor illustrated in FIG. 2 monitors a WDM signal light. Light signals of the respective wavelengths output from transmitters TX1-TX88 are multiplexed by a wavelength multiplexer MUX 10a, and emitted as a main signal. The main signal is branched by an optical coupler 15, and monitored by an optical channel monitor (OCM) 16.

When a wavelength tunable filter and a photodiode (PD) are used in the OCM, the power of each channel of the WDM signal is detected by sweeping of a pass-through wavelength by the wavelength tunable filter across a measurement wavelength band. For example, the photodiode detects the optical power that passed through while gradually changing the pass-through wavelength of the wavelength tunable filter. The detected optical power at a center wavelength of a peak in the optical power is taken as the optical power of each channel. A resolution of the OCM is determined based on a filter width of the wavelength tunable filter. OCMs that are put to practical use have adequate resolutions for WDM signals with an interval of 50 GHz, and reproduce a light spectrum waveform as well as the power level of each channel. Since the OCMs carry out Optical Signal To Noise Ratio (OSNR) measurements, the optical power level is measured accurately.

An OCM output waveform "b" has an adequate resolution with respect to an OCM input light spectrum "a" illustrated in FIG. 2 in order to detect a peak of each sub-channel signal, allowing the accurate detection of the optical power.

FIG. 3 illustrates an exemplary channel monitor. In FIG. 3, the Superchannel is employed. When the optical power of sub-channel signals of the Superchannel are being monitored, as illustrated in FIG. 3, the resolution of the OCM may not be enough because of a narrower wavelength interval among the sub-channel signals. For example, when a difference in power level with a neighboring channel is large, the spectrum waveform of the sub-channel signals may not be reproduced. Accordingly, the optical power level may not be accurately measured.

For example, since the wavelength interval among the sub-channel signals is narrow in an input light spectrum "a" illustrated in FIG. 3, the optical powers of the neighboring sub-channel signals may overlap in the OCM, as illustrated in an output light spectrum "b" of in FIG. 3. For example, since the OCM does not have the resolution high enough to detect the optical power of each sub-channel signal accurately, an error included in a detected value of an optical power monitor may become larger.

It is desirable to provide an optical power monitor that enables to monitor the optical power of a light signal even when the wavelength interval of the light signal is narrow.

Figure 4A:
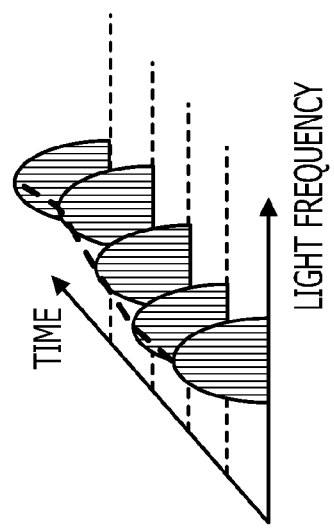
FIGS. 4A and 4B illustrate an exemplary frequency modulation superimposition.
Figure 4B:
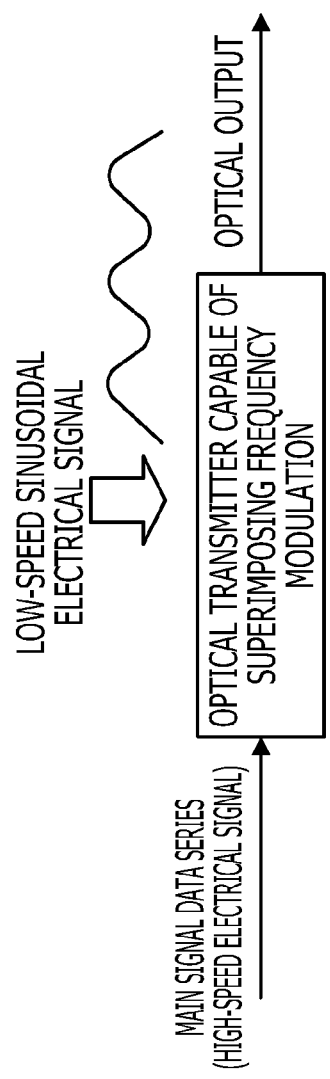

FIGS. 4A and 4B illustrate an exemplary frequency modulation superimposition. As illustrated in FIG. 4A, a low-speed sinusoidal signal is superimposed onto a high-speed main signal data series for frequency modulation of a light signal. A high-speed electrical signal corresponding to the main signal data series is applied to an optical transmitter 20, and a high-speed optical signal is generated. The low-speed sinusoidal signal is superimposed on the light signal by applying a low-speed sinusoidal electrical signal to the light transmitter 20 which is capable of superimposing a frequency modulation component. As illustrated in FIG. 4B, the superimposition of a frequency modulation component causes time variation of the optical output spectrum in a direction of the frequency axis. The low-speed frequency modulation signal may be a sinusoidal signal, a square wave, or a triangular wave.

Figure 5A:
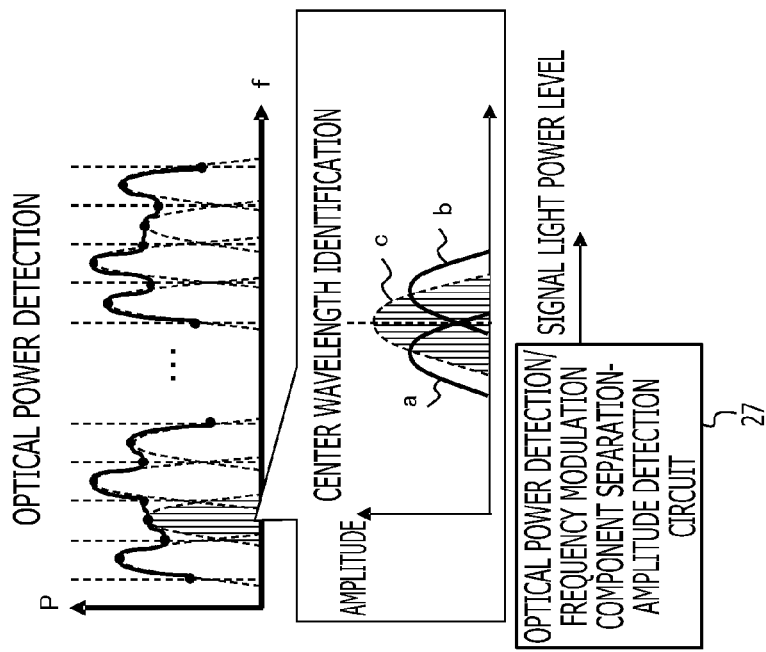
FIGS. 5A and 5B illustrate an exemplary monitor receiver portion.
Figure 5B:
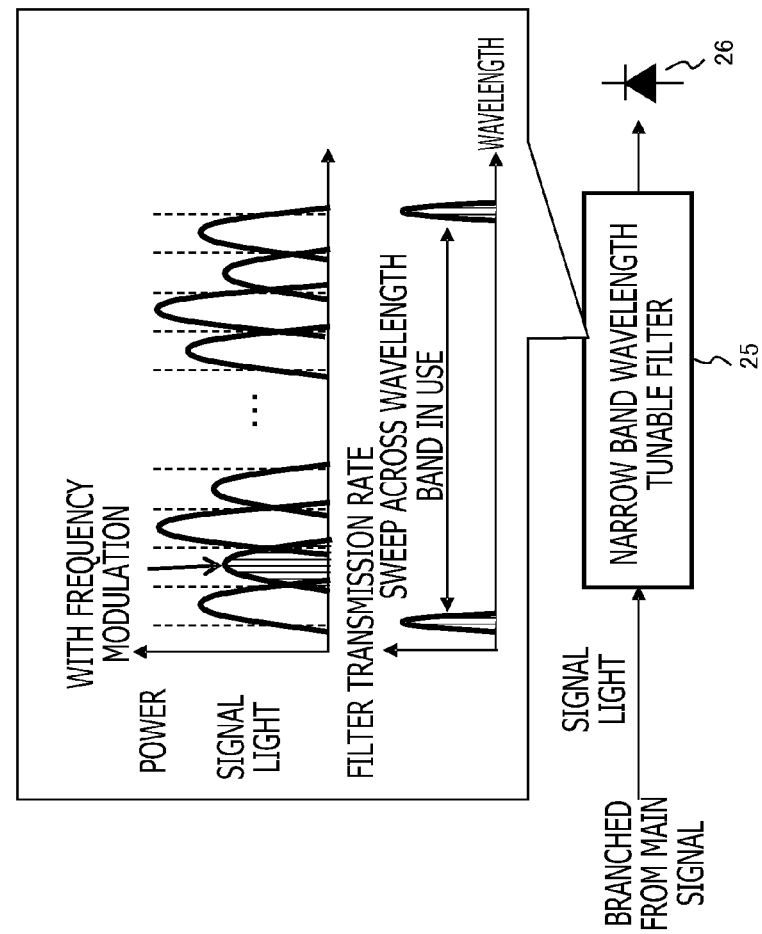

FIGS. 5A and 5B illustrate an exemplary monitor receiver portion. The signal light branched out from the main signal is input to a PD 26 after passing through a narrow-band wavelength tunable filter 25. A filter width of the wavelength tunable filter 25 may be substantially equal to or similar to a filter width used in a OCM.

The pass-through wavelength of the wavelength tunable filter 25 is swept across a wavelength band in use with a speed less than a speed of the low-speed frequency modulation superimposed on the main signal. An OCM detects the optical power that passed through the wavelength tunable filter 25.

A light transmission rate sharply changes with the wavelength at both shoulder portions of a pass band of the frequency characteristic of the wavelength tunable filter 25. Thus, when the wavelength tunable filter 25 sweeps the pass-through wavelength, the light signal on which the low-speed frequency modulation is superimposed moves in and out the pass band at the shoulder portion of the pass band of the frequency characteristic of the wavelength tunable filter 25. The optical power of the light signal, on which the low-speed frequency modulation was superimposed and which passed through the pass band, changes at both the shoulder portions, causing the frequency modulation component to be detected as a change in light intensity. When the low-speed frequency modulation is applied only to a light signal to be measured, the change in light intensity is detected only in the light signal to be measured at both the shoulder portions of the frequency characteristic of the wavelength tunable filter 25. Thus, when an optical power detection/frequency modulation component separation-amplitude detection circuit 27 extracts a frequency component of the low-speed frequency modulation that appears as the change in light intensity, two mountains, for example, "a" and "b" illustrated in FIG. 5B, appear along the sweep direction of the wavelength tunable filter 25. A middle point, for example, "c" in FIG. 5B, of the two mountains, for example, "a" and "b" illustrated in FIG. 5B, along the sweep direction is identified as a peak of the light signal to be measured. When optical power data that is measured in a vicinity of the middle point is used, the power level is detected accurately.

In FIG. 5A, the wavelength band in use for the wavelength tunable filter 25 is swept in a wavelength direction. In FIG. 5B, the sweep direction of the wavelength tunable filter 25 is indicated by time that takes to sweep. Accordingly, a time direction indicated in FIG. 5B may be a frequency direction of the light spectrum or the wavelength direction illustrated in FIG. 5A.

A high precision light spectrum analyzer with a simple structure is provided, and the power levels at the respective points in wavelength domain are obtained.

The frequency of the frequency modulation may be within a range that does not affect a lower range side frequency component of the high-speed main signal. The range may change based on a modulation format or a modulation speed of the main signal. However, any frequency up to hundreds of kHz may be used without difficulty.

A peak position of a light signal at each wavelength of a WDM signal is identified even when the wavelength interval is narrow like as the sub-channel signals of the Superchannel. Since the power is detected in a vicinity of the peak position, the optical power is monitored accurately.

Accurate monitoring is performed since a position where the sub-channel signal exists is identified even when the center wavelength of the sub-channel signal is shifted from a prescribed wavelength. Signals, in which the frequency interval of the WDM signal is separated by about amplitude of the frequency modulation, may be detected contemporaneously by applying the frequency modulation to two or more sub-channel signals.

All signals may be detected contemporaneously when frequency modulations with different frequencies are applied to the respective signals, and a plurality of detectors, each of which corresponds to the respective frequencies, is prepared in a detector, or a single detector capable of detecting a plurality of frequencies is prepared.

Figure 6:
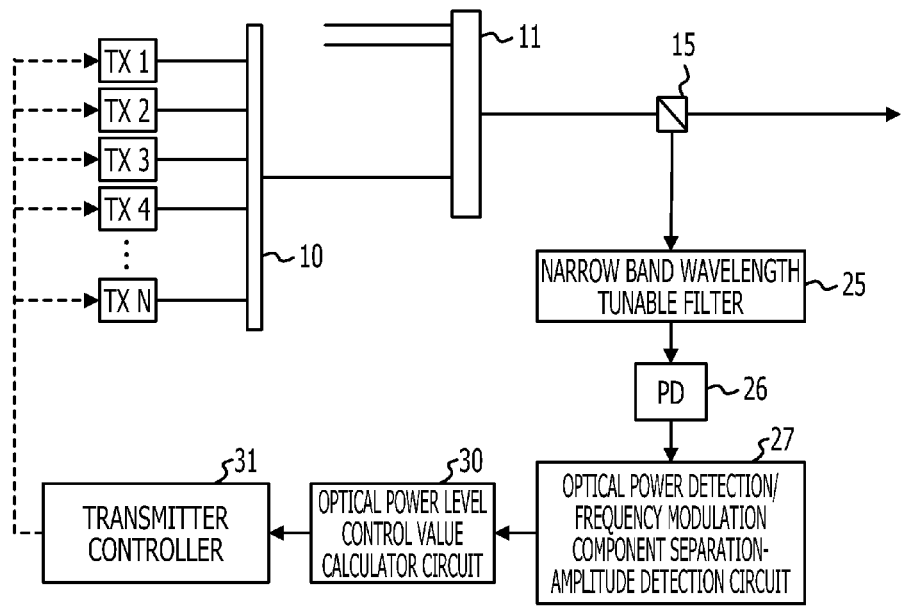
FIG. 6 illustrates an exemplary optical power monitor.

FIG. 6 illustrates an exemplary optical power monitor. In FIG. 6, the optical power level of each signal in a WDM system is controlled by use of a signal power level detection function. Along with an obtainment of the optical power, the frequency modulation component is detected, and the power level of a signal to be measured is detected. A comparison with a target power level is carried out. A difference is fed back to a circuit that includes a transmitter controller 31 and an optical power level control value calculator circuit 30, and optical output power values of transmitters TX1-TXN are reset. The target optical power level may be set by repeating the foregoing processes.

The transmitters TX1-TXN output light signals of the respective wavelengths. For example, the transmitters TX1-TXN each output a light signal in a sub-channel of a Superchannel. A light wavelength multiplexer 10 multiplexes the light signals output from the transmitters TX1-TXN and generates a Superchannel. Although it is not shown in FIG. 6, a plurality of sets of transmitters and wavelength multiplexers, which generate Superchannels, are prepared. These Superchannels are multiplexed by a wavelength multiplexer 11 to generate a WDM signal.

The signal light output from the wavelength multiplexer 11 is branched by an optical coupler 15 and is input to the narrow band wavelength tunable filter 25. The narrow band wavelength tunable filter 25 changes the center wavelength of the pass band and sweeps across a main signal's wavelength band in use. A light passed through the narrow band wavelength tunable filter 25 is converted into an electrical signal by the PD26. An output of the PD 26 is input to the optical power detection/frequency modulation component separation-amplitude detection circuit 27. In the optical power detection/frequency modulation component separation-amplitude detection circuit 27, the frequency modulation component superimposed on a sub-channel of the main signal is detected, and the optical power of the sub-channel is detected.

In the optical power level control value calculator circuit 30, the optical power of the detected sub-channel is compared with an optical power target value, and a difference therebetween is input to the transmitter controller 31. The transmitter controller 31 changes a transmission power in one of the transmitters TX1-TXN, which corresponds to the sub-channel for which the optical power is detected, by an amount of the difference based on a signal from the optical power level control value calculator circuit 30. The transmitter controller 31 applies a low-speed frequency modulation (FM modulation) to one of transmission signals of the transmitters TX1-TXN, which corresponds to a sub-channel for which the optical power is to be detected.

The number of sub-channels for which the optical power is to be detected may be one, or the optical power of plural sub-channels may be contemporaneously detected. For example, when the amplitude of the frequency modulation is less than the frequency interval of the sub-channels, the transmitter controller 31 may apply a low-speed frequency modulation signal to two or more transmitters, or two or more low-speed frequency modulation signals with different frequencies to two or more transmitters. In the optical power detection/frequency modulation component separation-amplitude detection circuit 27, intensity changes of the optical power, which appear as the narrow-band wavelength tunable filter 25 sweeps the pass band, are detected, and the optical power of the sub-channel is detected by the foregoing method.

Figure 7:
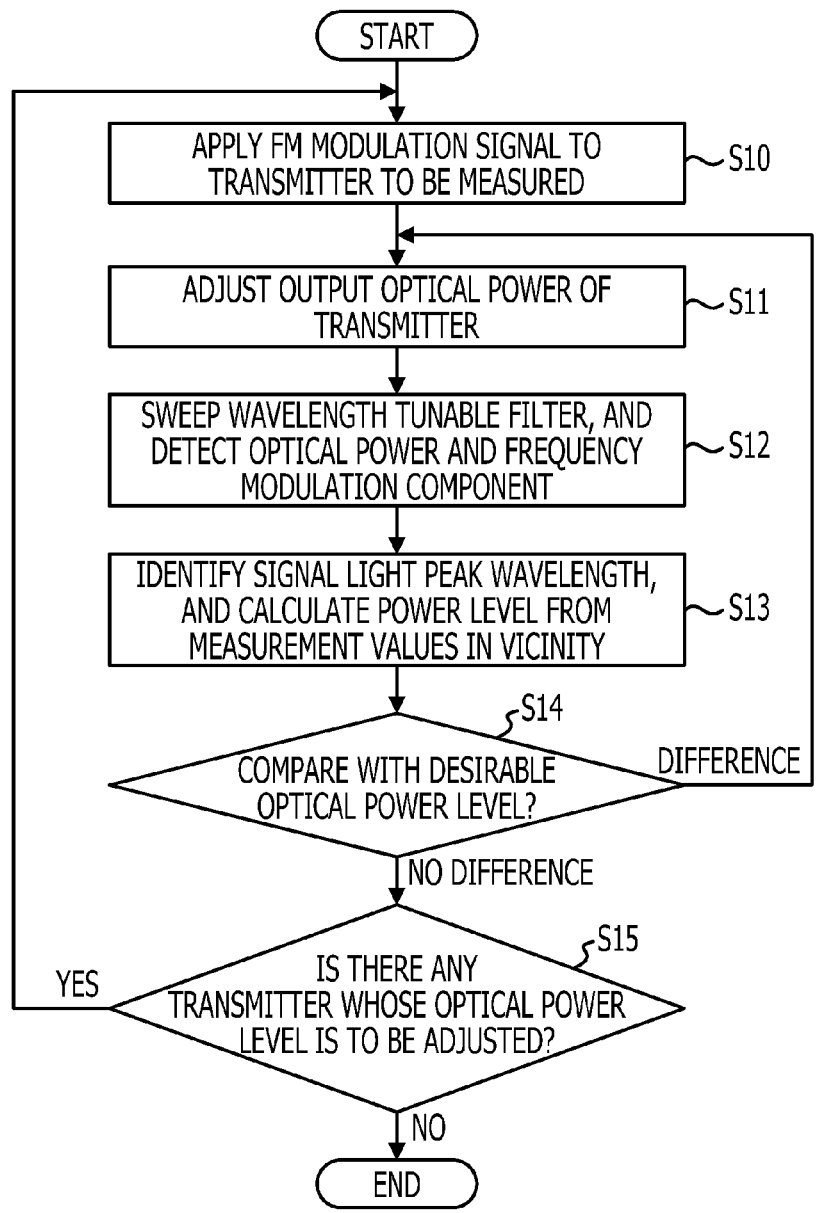
FIG. 7 illustrates an exemplary optical power adjustment.

FIG. 7 illustrates an exemplary optical power adjustment. In FIG. 7, the optical power is adjusted by utilizing the optical power monitor. A frequency modulation signal is applied to a transmitter that transmits a sub-channel to be measured (operation S10). In an operation S11, an adjustment of the output optical power is performed. The optical power and the frequency modulation component are detected by sweeping of the wavelength tunable filter (operation S12). A peak wavelength of a signal light to be measured is identified based on the detection of the frequency modulation component, and a power level is calculated from optical power measurement values in a vicinity of the peak wavelength (operation S13). The calculated power level is compared with a target optical power level (operation S14). When there is a difference, an optical output power of the transmitter is readjusted (operation S11), and the optical power level is measured (operations S12, S13). The foregoing operations are repeated until the optical power level reaches a desirable value. Subsequently, in an operation S15, it is determined whether or not there is another transmitter whose optical power level is to be adjusted. When there is another transmitter, the process proceeds to the adjustment of a transmitter in a different channel. When the adjustment is completed for all the transmitters, the control of optical power level ends.

Figure 8:
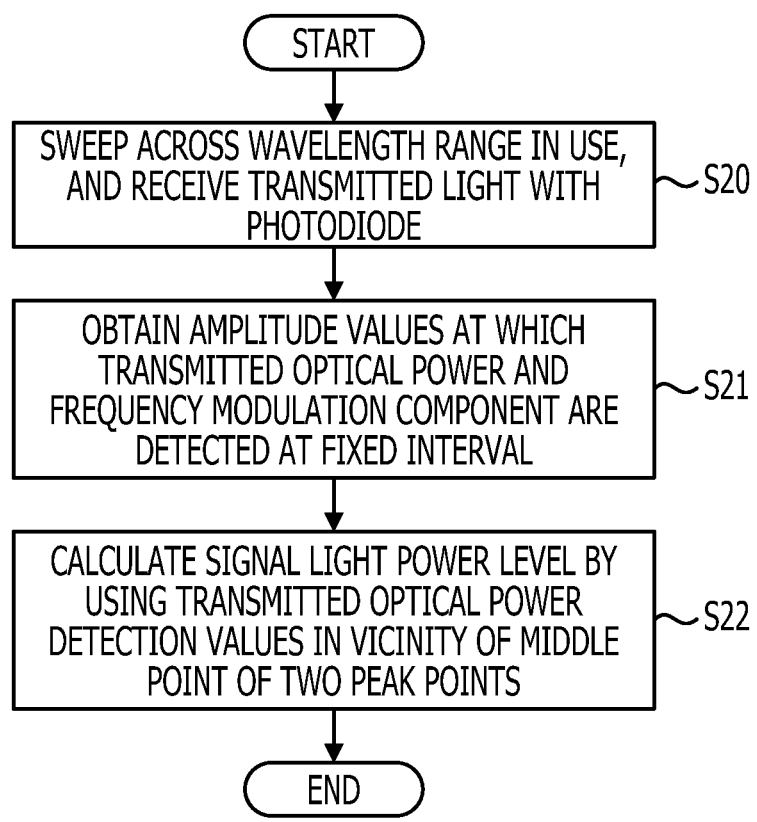
FIG. 8 illustrates an exemplary peak detection process.

FIG. 8 illustrates an exemplary peak detection process. In an operation S20, the narrow-band wavelength tunable filter sweeps across the wavelength range in use, and a transmitted light is received by the photodiode. In an operation 21, the optical power detection/frequency modulation component separation-amplitude detection circuit obtains amplitude values at which the transmitted optical power and the frequency modulation component are detected at a fixed interval during the sweeping of the wavelength tunable filter. In an operation S22, a middle point in between two peak points obtained by the amplitude value detection using the frequency modulation is identified as the center wavelength of a wavelength to be measured, and the optical power level of the wavelength to be measured is calculated by use of the transmitted optical power detection values in its vicinity.

Figure 9:
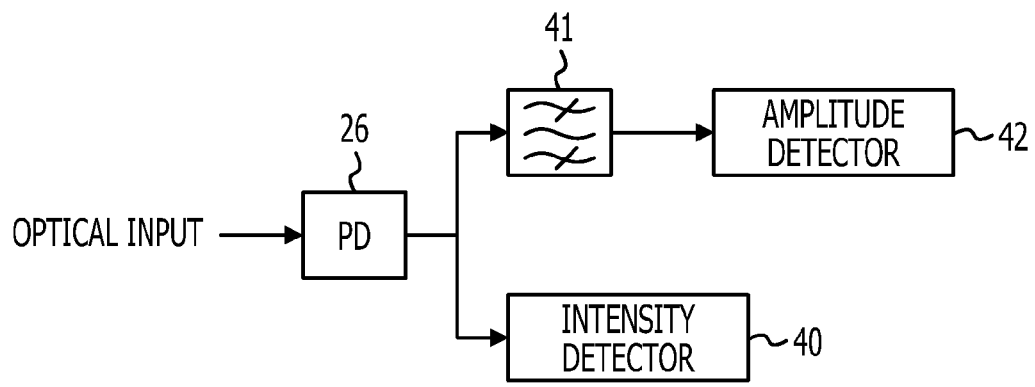
FIG. 9 illustrates an exemplary detection processing portion.

FIG. 9 illustrates an exemplary detection processing portion. The detection processing portion illustrated in FIG. 9 may be included in the optical power detection/frequency modulation component separation-amplitude detection circuit. An optical input from the narrow band wavelength tunable filter is input to the PD26 and converted into an electrical signal. An output of the PD26 is input to an intensity detector 40, and the optical power intensity of a signal light received by the PD26 is detected. The optical power intensity detected by the intensity detector 40 becomes an intensity measurement value in each wavelength in a spectrum of the signal light. The output of the PD 26 is also input to a band pass filter 41. In the band pass filter 41, a pass band may be set in such a way that only a frequency component of the frequency modulation is extracted. In a case where the frequency modulation components are superimposed onto two or more sub-carriers with different frequencies, a variable pass band may be set in the band pass filter 41, or the pass band may be set in such a way that two or more frequency components are allowed to pass through. A transmitted signal from the band pass filter 41 is input to an amplitude detector 42, and an intensity change of the signal is detected. In a case where the frequency modulation is superimposed on a single sub-carrier or wavelength, the intensity change is detected at two points during the sweeping of the pass band by the narrow-band wavelength tunable filter which is not shown in the figure. A middle point of those two points may be a wavelength position where the sub-carrier exists, and the optical power at the middle point is set as the optical power of a sub-carrier to be measured.

Figure 10:
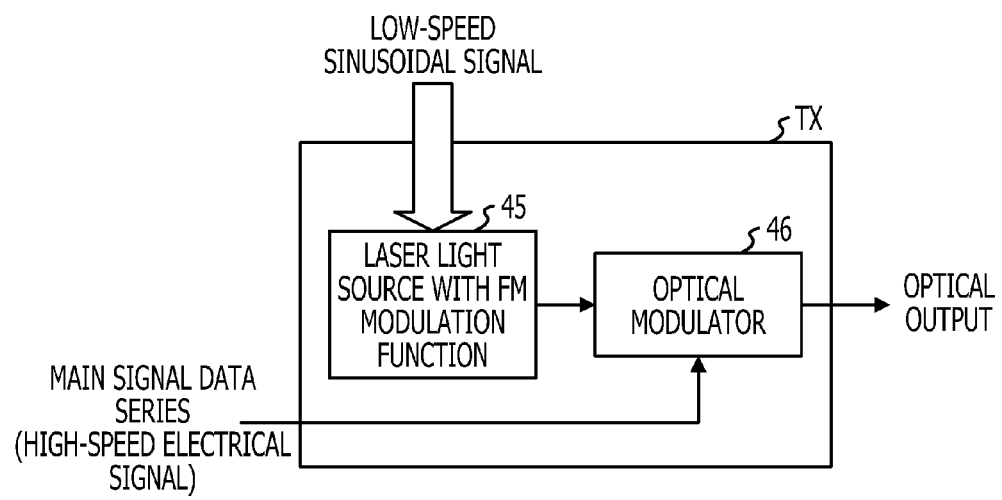
FIG. 10 illustrates an exemplary transmitter.
Figure 11:
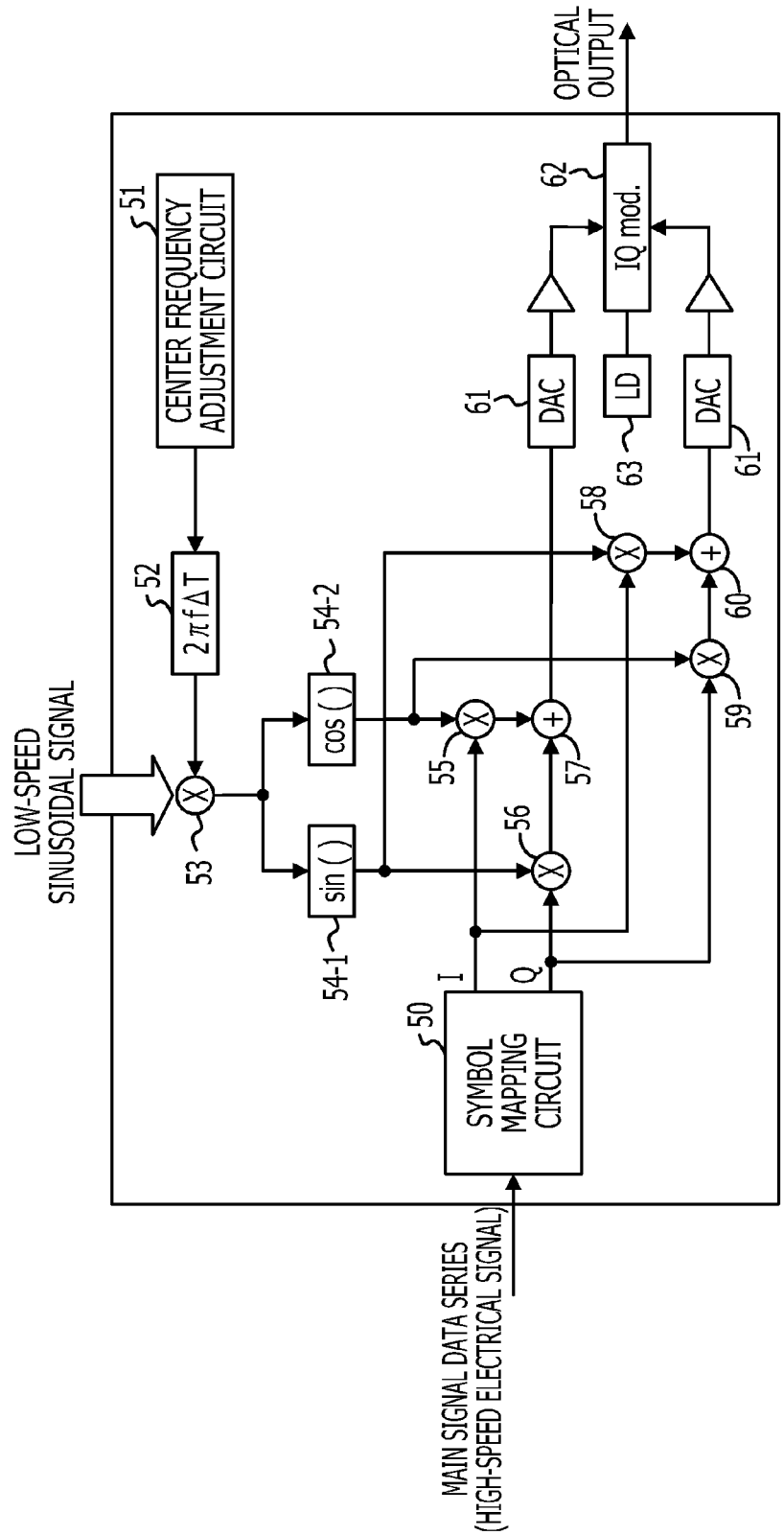
FIG. 11 illustrates an exemplary transmitter.

FIG. 10 and FIG. 11 illustrate an exemplary transmitter. A low-speed frequency modulation is applied to the respective transmitters illustrated in FIG. 10 and FIG. 11. In FIG. 10, a laser light source with a FM modulation function is used. A transmitter TX is provided with an optical modulator 46 and a laser light source 45 with a FM modulation function. A high-speed electrical signal representing the main signal data series is applied to the optical modulator 46, and data modulation for a light from the laser light source 45 is controlled. A low-speed frequency signal applies a low-speed sinusoidal signal to the laser light source 45 with a FM modulation function, and changes an oscillation frequency of a light of the laser light source 45.

In FIG. 11, a FM modulation is superimposed by digital signal processing of an optical modulator drive signal. For example, a technology described in Japanese Patent Application No. 2010-269020 may be used. In a transmitter illustrated in FIG. 11, the optical modulation is performed. A high-speed electrical signal of the main signal data series is mapped onto I and Q signals in a symbol mapping circuit 50. A center frequency adjustment circuit 51 sets the center frequency of a sub-channel. An arithmetic unit 52 calculates $2\pi f \Delta T$ by using the center frequency thus set, where f is the center frequency, $\Delta T$ is a time interval of a digital time variable. An output of the arithmetic unit 52 is multiplied by a low-speed sinusoidal signal in a multiplier 53, and a carrier wave on which I or Q signal is superposed is generated by sine-cosine generator portions 54-1 and 54-2. The I and Q signals are multiplied by the generated sine and cosine waves in form of complex number by multipliers 55, 56, 58, 59 and adders 57, 60. The obtained two signals as described above are converted to analog signals by digital to analog converters (DACs) 61, and applied to an IQ modulator 62 for use in modulating a light from a laser diode LD 63.

Figure 12:
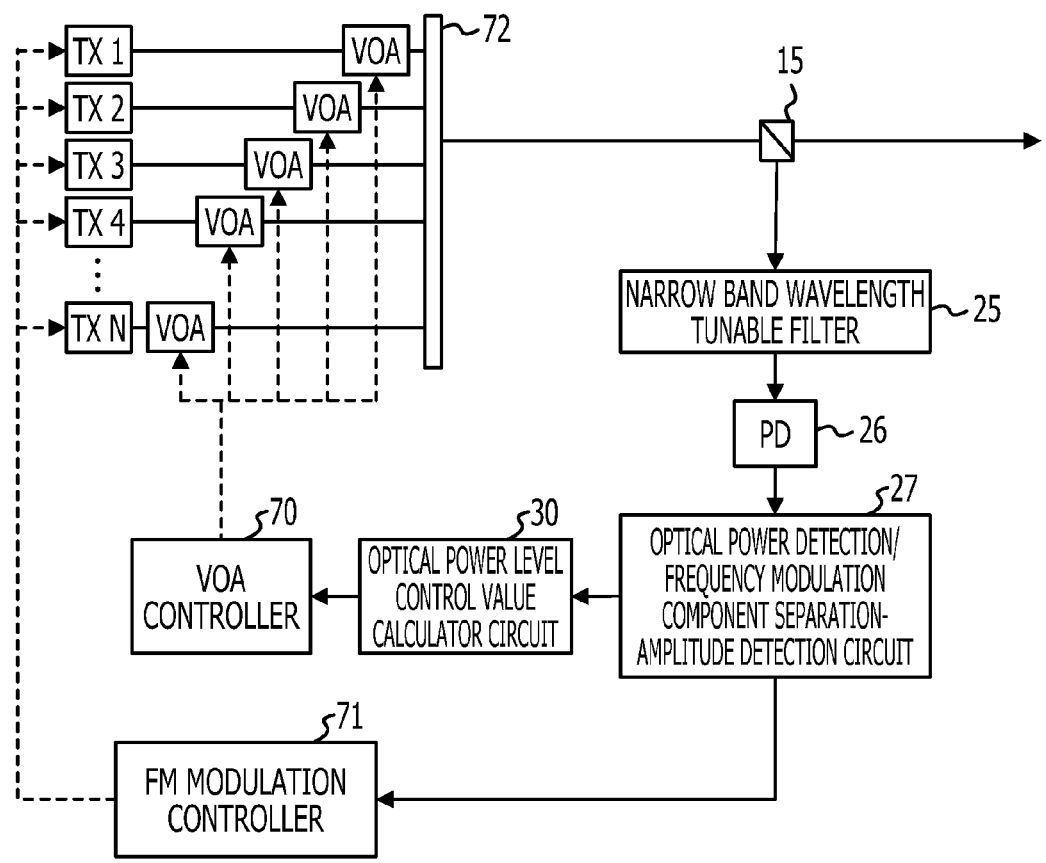
FIG. 12 illustrates an exemplary transmitter.

FIG. 12 illustrates an exemplary transmitter. In the transmitter illustrated in FIG. 12, an attenuator is used for controlling the optical power. In FIG. 12, the same reference numerals denote elements substantially identical or similar to those of FIG. 6, and descriptions thereof may be omitted or reduced. A signal light of the main signal emitted from a wavelength multiplexer 72 is branched by the optical coupler 15 and subjected to filtering by the narrow band wavelength tunable filter 25. An output light from the narrow band wavelength tunable filter 25 is converted to an electrical signal by the PD 26, and the optical power of a wavelength of a sub-channel is detected by the optical power detection/frequency modulation component separation-amplitude detection circuit 27. An output signal from the optical power detection/frequency modulation component separation-amplitude detection circuit 27 is input to the optical power level control value calculator circuit 30, and the detected optical power is compared with an optical power target value. A difference value is input to a variable optical attenuator (VOA) controller 70. The VOA controller 70 adjusts the optical power by setting an attenuation amount of the optical power of a signal light from a transmitter of a sub-channel, which is a control target, based on the difference between the target value and the optical power from the optical power level control value calculator circuit 30, and by controlling a variable optical attenuator (VOA) of the sub-channel which is a control target.

Information regarding a measurement target sub-channel from the optical power detection/frequency modulation component separation-amplitude detection circuit 27 is input to a FM modulation controller 71, and it is determined which sub-channel becomes a measurement target of the optical power. For example, the measurement target may be selected in ascending order of the wavelength. The FM modulation controller 71 selects one of the transmitters TX1-TXN, which corresponds to the sub-channel of the measurement target of the optical power, and applies a low-speed frequency modulation signal to the selected transmitter.

Figure 13:
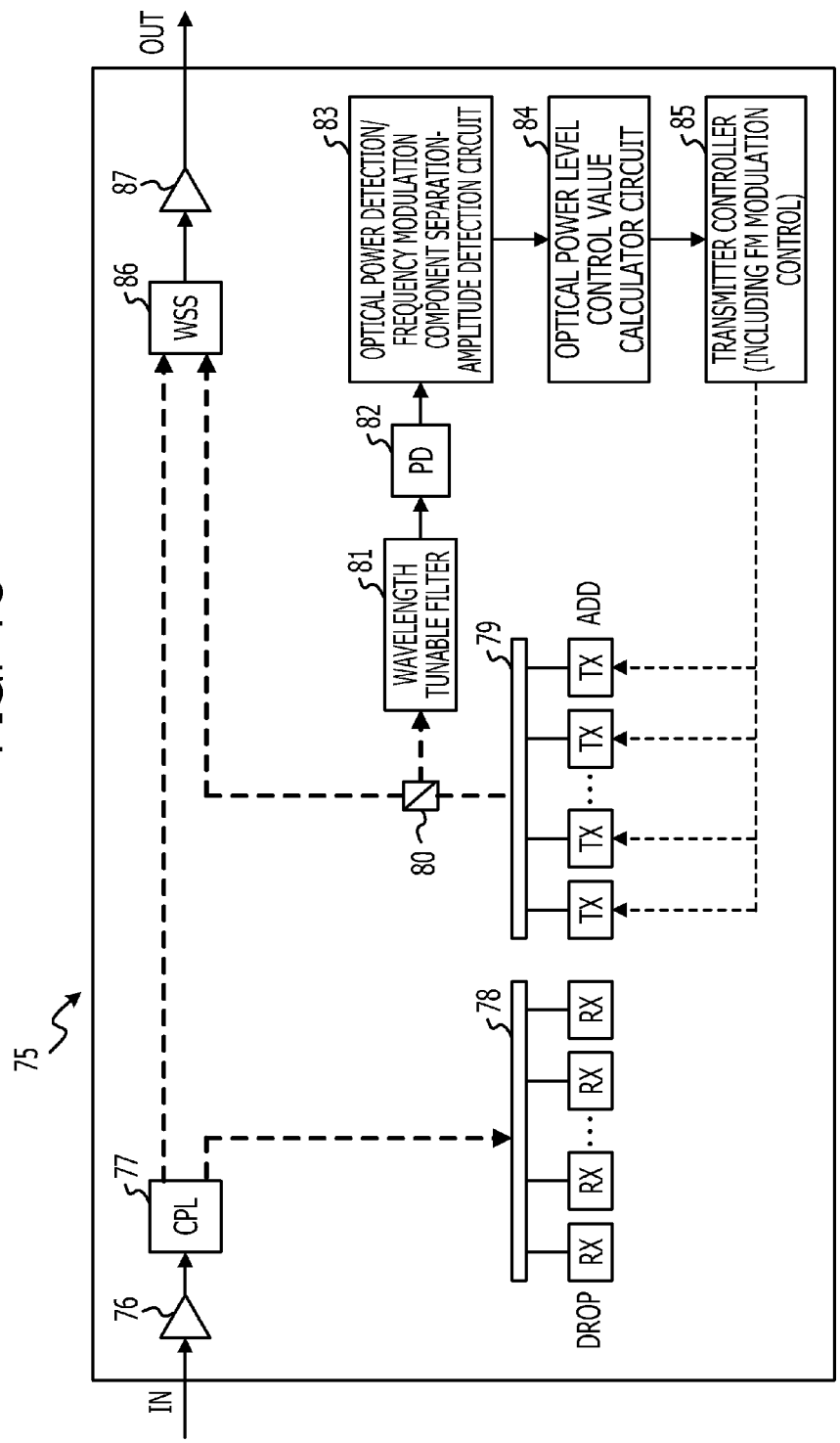
FIG. 13 illustrates an exemplary add-drop node.

FIG. 13 illustrates an exemplary add-drop node. In FIG. 13, a coupler 80, a wavelength tunable filter 81, a PD 82, an optical power detection/frequency modulation component separation-amplitude detection circuit 83, an optical power level control value calculator circuit 84, and a transmitter controller 85 may correspond to the coupler 15, the narrow band wavelength tunable filter 25, the PD 26, the optical power detection/frequency modulation component separation-amplitude detection circuit 27, the optical power level control value calculator circuit 30, and the transmitter controller 31 illustrated in FIG. 6, respectively.

A signal light input to the add-drop node 75 is amplified by a pre-amplifier 76 and input to a coupler 77. The coupler 77 branches an output of the pre-amplifier 76. A branched signal light is input to a wavelength demultiplexer 78 and demultiplexed into light signals of the respective wavelengths. The demultiplexed light signal is received by one of receivers RX.

Part of the signal light branched out from the coupler 77 is input to a wavelength selective switch (WSS) 86. The WSS 86 selects a wavelength of a light signal to be added, multiplexes with the light signal directly input from the coupler 77, and outputs an output signal light. The output signal light of the WSS 86 is amplified by a post-amplifier 87 and emitted.

The light signals to be added in the WSS 86 are emitted from transmitters TX and multiplexed by a wavelength multiplexer 79. An output signal light from the wavelength multiplexer 79 is branched by the optical coupler 80, and part of the output signal light is input to the wavelength tunable filter 81. The wavelength tunable filter 81 changes its pass band and sweeps across a wavelength band in use. The PD 82 converts a light signal passed through the wavelength tunable filter 81 into an electrical signal. The optical power detection/frequency modulation component separation-amplitude detection circuit 83 detects the optical power of a signal light of a wavelength in a measurement target sub-channel, from the electrical signal from the PD 82. In the optical power level control value calculator circuit 84, the detected optical power is compared with a target value, and a difference therebetween is calculated. The calculated difference in the optical power level control value calculator circuit 84 is input to the transmitter controller 85, and may be used for controlling the optical power of a light signal emitted from the transmitter TX. The transmitter controller 85 applies a low-speed frequency modulation signal to the transmitter TX to perform a control for applying a low-speed FM modulation to the transmitter TX of the measurement target sub-channel.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical power monitor that detects optical power of respective wavelengths of a signal light in a wavelength multiplexing system, comprising:
   a light emitter configured to superimpose a frequency modulation component on the signal light;
   a wavelength tunable filter configured to sweep a pass band of the signal light across a wavelength band for the signal light; and
   a detector configured to detect intensity changes in optical power passing through the wavelength tunable filter with a frequency modulation, and to detect an optical power measurement value at a middle point of two points of the intensity changes of the optical power as the optical power of a wavelength to be measured,
   wherein the detector includes a filter configured to extract the frequency modulation component and an amplitude detector configured to detect the intensity changes based on the frequency modulation component output from the filter.

2. The optical power monitor according to claim 1,
wherein the frequency modulation component is obtained by applying a sinusoidal frequency control signal on a light source with a variable oscillation frequency provided in the light emitter.

3. The optical power monitor according to claim 1,
wherein the frequency modulation component is obtained by superimposing a sinusoidal signal on a drive signal of an optical modulator for data signal modulation provided in the light emitter.

4. An optical power control system comprising:
an optical power monitor configured to detect optical power of respective wavelengths of a signal light; and
a controller configured to control the optical power, wherein the power monitor includes:
a light emitter configured to superimpose a frequency modulation component onto the signal light;
a wavelength tunable filter configured to sweep a pass band of the signal light across a wavelength band for the signal light; and
a detector configured to detect intensity changes in optical power passing through the wavelength tunable filter with a frequency modulation, and to detect an optical power measurement value at a middle point of two points of the intensity changes of the optical power as the optical power of a wavelength to be measured,
wherein the controller controls the light emitter based on a detected optical power, and
wherein the detector includes a filter configured to extract the frequency modulation component and an amplitude detector configured to detect the intensity changes based on the frequency modulation component output from the filter.

5. The optical power control system according to claim 4,
wherein the controller compares the detected optical power with a target value, and controls the light emitter so as that the detected optical power becomes substantially equal to the target value.

6. The optical power control system according to claim 4,
wherein the light emitter includes a plurality of transmitters, and
wherein the controller supplies a control signal to a transmitter selected from the plurality of transmitters.

7. The optical power control system according to claim 4,
wherein the optical power monitor and the controller are provided in an add-drop node.

8. An optical power monitor method for detecting optical power of respective wavelengths of a signal light in a wavelength multiplexing system, comprising:
superimposing a frequency modulation component on the signal light;
sweeping a pass band of a wavelength tunable filter across a wavelength-band for the signal light;
detecting intensity changes in optical power passing through the wavelength tunable filter with a frequency modulation;
extracting the frequency modulation component by a filter;
detecting intensity changes based on the frequency modulation component output from the filter; and
detecting an optical power measurement value at a middle point of two intensity change points of the optical power along a sweep direction as the optical power of a wavelength to be measured.

9. The optical power monitor according to claim 1, wherein the detector includes a photodiode configured to convert an output of the wavelength tunable filter into an electrical signal.

10. The optical power control system according to claim 4, wherein the detector includes a photodiode configured to convert an output of the wavelength tunable filter into an electrical signal.

11. The optical power monitor according to claim 1, wherein the detector includes an intensity detector configured to detect an intensity of the optical power in each wavelength in a spectrum of the signal light.

12. The optical power control system according to claim 4, wherein the detector includes an intensity detector configured to detect an intensity of the optical power in each wavelength in a spectrum of the signal light.

* * * * *